United States Patent [19]
Kinal et al.

[11] Patent Number: 6,040,798
[45] Date of Patent: Mar. 21, 2000

[54] SATELLITE RADIODETERMINATION

[75] Inventors: George Vladimir Kinal, London; James Robert Nagle, II, Northwood; Claudio Soddu, Harrow; Fintan Richard Ryan, Weybridge, all of United Kingdom

[73] Assignee: International Mobile Satellite Organization, London, United Kingdom

[21] Appl. No.: 08/730,208

[22] Filed: Oct. 15, 1996

[51] Int. Cl.[7] .............................. G01S 5/02; H04B 7/185
[52] U.S. Cl. ..................................... 342/357.01; 342/352
[58] Field of Search ............................... 342/352, 357.1, 342/357.01, 453; 701/213, 223

[56] References Cited

U.S. PATENT DOCUMENTS

| | | |
|---|---|---|
| 3,384,891 | 5/1968 | Anderson . |
| 3,866,229 | 2/1975 | Hammack . |
| 4,114,155 | 9/1978 | Raab . |
| 4,359,733 | 11/1982 | O'Neill . |
| 4,445,118 | 4/1984 | Taylor et al. . |
| 4,613,864 | 9/1986 | Hofgen . |
| 4,652,884 | 3/1987 | Starker . |
| 4,744,083 | 5/1988 | O'Neill et al. . |
| 4,751,512 | 6/1988 | Longaker . |
| 4,754,465 | 6/1988 | Trimble . |
| 5,099,245 | 3/1992 | Sagey . |
| 5,323,322 | 6/1994 | Mueller et al. . |
| 5,345,245 | 9/1994 | Ishikawa et al. . |
| 5,365,447 | 11/1994 | Dennis . |
| 5,428,358 | 6/1995 | Gardner . |
| 5,444,451 | 8/1995 | Johnson et al. ........................... 342/453 |
| 5,455,823 | 10/1995 | Noreen et al. . |
| 5,621,646 | 4/1997 | Enge et al. ............................... 364/449 |
| 5,828,336 | 10/1998 | Yunck et al. ............................. 342/357 |

FOREIGN PATENT DOCUMENTS

| | | |
|---|---|---|
| 0 609 935 A2 | 1/1994 | European Pat. Off. . |
| 2 180 526 | 4/1987 | United Kingdom . |
| 2 264 837 | 9/1993 | United Kingdom . |
| WO 95/18977 | 1/1994 | WIPO . |
| WO 94/12892 | 9/1994 | WIPO . |

OTHER PUBLICATIONS

George V. Kinal et al, INMARSAT Land Mobile and Special Services Division, IEEE NTC–92 National Telesystems Conference, 1992.

L. Caporicci et al, GPS Integrity Monitoring And System Improvement With Ground Station And Multistationary Satellite Support, IEEE Plans '92 Position Location And Navigation Symposium.

Barry A. Stein et al, "Global Positioning System Integrity Channel: A System Design Analysis", IEEE 9th Digital Avionics Systems Conference, 1990.

(List continued on next page.)

Primary Examiner—Thomas H. Tarcza
Assistant Examiner—Dao L. Phan
Attorney, Agent, or Firm—Banner & Witcoff, Ltd.

[57] ABSTRACT

A satellite radiodetermination system comprises global navigation service (GNSS) satellites 2 such as GPS satellites, which generate GNSS ranging signals $R_n$, geostationary satellites 6 which retransmit ranging signals $R_g$ generated at a navigation land earth station (NLES) 8, including augmentation data A, and medium earth orbit (MEO) satellites 10 which generate ranging signals $R_m$ including regional augmentation data RA transmitted from a satellite access node (SAN) 14. The regional augmentation data RA is supplied by regional augmentation systems 21a, 21b.

A navigation receiver 11 receives the ranging signals $R_g$, $R_m$, $R_n$ and calculates ionospheric delay values for those ranging signals which are provided on dual frequencies. Using these ionospheric delay values, and optionally the regional augmentation data RA and the augmentation data A, the navigation receiver estimates ionospheric delay values for those ranging signals which are provided on single frequencies. The navigation receiver uses the ranging signals, corrected for ionospheric delay and errors indicated by the augmentation data A and regional augmentation data RA, to calculate position and time accurately.

9 Claims, 6 Drawing Sheets

OTHER PUBLICATIONS

J.R. Nagle, et al, "Global Navigation Satellite System (GNSS) Alternatives For Future Civil Requirements", Plans '94 Technical Program, 1994.

A.J. Van Dierendonck et al, "Implementation Of The GNSS Integrity Channel And Future GNSS Growth Considerations", International Navigation Association 18th Annual Meeting, 1993.

A.J. Van Dierendonck et al, "Evolution to Civil GNSS Taking Advantage Of Geostationary Satellites", ION 49th Annual Meeting, 1993.

George V. Kinal et al, Geostationary Augmentation Of Global Satellite Navigation—1991 Update, NAV 91 Satellite Navigation Conference, 1991.

Jim Nagle, "Status of Inmarsat Integrated Navigation/Communication Activities", 47th Annual Meeting of The Institute of Navigation, 1991.

J.R. Nagle et al, "Geostationary Repeaters: A Low Cost Way To Enhance Civil User Performance Of GPS and Glonass", IEEE Plans 90, 1990.

G. Kinal et al, A Comparison of Narrowband Communications Frequency and Wideband Navigation Frequency GPS Integrity Channel Approaches, RTCA SC–159, 1990.

Global Positioning System Standard Positioning Service Signal Specification, 2nd Edition, 1995.

George V. Kinal, "Integrity Monitoring Of Global Navigation Satellite Systems", GPS International Seminar, 1992.

Standard Search Report.

SATELLITE RADIODETERMINATION

This invention relates to methods and apparatus for radiodetermination. Radiodetermination comprises the determination of position and/or time by the use of ranging signals between a terminal and a plurality of beacons. In satellite radiodetermination the beacons are satellites in orbit.

At the present time, two global radiodetermination systems exist. The GPS/NAVSTAR system comprises a constellation of satellites in twelve hour orbits, operated by and for the US Department of Defense. The GLONASS positioning system provides similar facilities under the control of the Russian government (and will not be discussed further herein).

In the GPS/NAVSTAR system, each satellite carries a highly accurate atomic clock and the clocks of all the satellites are synchronised. The orbits of all the satellites are well characterised, and each satellite is therefore able to derive its instantaneous position. The satellites periodically receive information on variations in their orbits from a terrestrial station.

The satellites broadcast regular messages which carry:
1. the time, as indicated by the on-board atomic clock,
2. the position of the satellite, and
3. status messages.

Details of the GPS signal format may be found in the "Global Positioning System Standard Position Service Signal Specification", 2nd edition, Jun. 2, 1995, incorporated herein by reference.

A GPS receiver on earth is able to acquire signals from several satellites. The constellation is designed so that, for almost every point on earth at almost every time of day, at least four satellites are simultaneously in view. By noting the different times of arrival of signals from different satellites, using the received clock data, and with knowledge of the satellite positions (transmitted with the signals) the GPS receiver is able to calculate the relative range from each satellite and, from these four relative ranges thus calculated, to calculate its position in three dimensions and calibrate its clock.

Changes in the delay caused by variations in the ionosphere can degrade the accuracy of radiodetermination measurements, and accordingly, to enable some compensation for this, each satellite broadcasts on two frequencies (termed L1 and L2). A military GPS receiver is able, by measuring on two frequencies, to estimate and correct the ionospheric delay, since the ionospheric delay varies as a function of frequency.

Although GPS/Navstar is primarily for military use, receivers are widely available to civilians. However, the civilian receivers cannot decode the "P-code" by which information signals are encrypted on the first and second frequencies and hence cannot perform a two-frequency ionospheric compensation. Also, to limit the accuracy of the service to non military users, the so called "selective availability" feature introduces deliberate minor errors of timing and/or position into the information signals encoded by the "C/A code" and transmitted only on the L1 frequency from various satellites. Military receivers are able to decode signals without these deliberate errors.

It is possible for a ground station of accurately known position to determine which satellites are in error and by how much, and it is known to broadcast a signal which indicates which satellites are in error, and the amount of correction to apply for reception by GPS receivers, to enable them to compensate the errors from a single frequency measurement and thus derive a reliable position signal. Broadcasting such signals via a geostationary satellite is taught in, for example, U.S. Pat. No. 4,445,110.

However, whilst the correction to be applied can be calculated exactly by the reference ground station of known position, this correction becomes progressively less accurate further away from the reference ground station, because of differences in the ionosphere (and other layers of the atmosphere such as the troposphere). Accordingly, the usefulness of such "differential GPS" techniques is limited.

Rather than providing a GPS receiver which operates to receive two frequencies in order to compensate for ionospheric variations, or one which receives a differential GPS correction, it is possible to broadcast a signal which includes some data about ionospheric conditions. In recent years, the possibility of a wide area differential system has been discussed. One example is the Wide Area Augmentation System (WAAS) proposed by the US Federal Aviation Authority to provide differential correction information over the US. In such a wide area system, ionosphere correction data for a grid of spaced apart points. in an area (e.g. Europe or the US) is broadcast via a geostationary satellite serving that area, and at the receiver, an interpolation is performed between grid points to derive a value for the ionosphere delay correction to be applied to a single frequency signal from each GPS satellite in view. Also broadcast is correction data for compensating for "selective availability" errors. U.S. Pat. No. 5,323,322 describes a satellite radiodetermination system in which ionospheric data is broadcast.

It has been proposed in the papers "Evolution to civil GNSS taking advantage of geostationary satellites", ION 49th Annual Meeting, June 1993, "Implementation of the GNSS integrity channel and future GNSS growth considerations", INA 18th Annual Meeting, October 1993, and "Global Navigation Satellite System (GNSS) Alternatives for Future Civil Requirements", PLANS ' 94 Technical Program, April 1994, all by J. R. Nagle, G. V. Kinal and A. J. Van Dierendonck, to supplement the GPS/NAVSTAR system by additional civil satellites in low earth, intermediate or geostationary orbits.

According to one aspect of the present invention, there is provided a satellite radiodetermination receiver which receives a multiple frequency ranging signal and a single frequency ranging signal, derives an ionospheric delay value from the multiple frequency ranging signal by measuring the relative delay between the different frequencies at which the multiple frequency ranging signal is transmitted and estimates a delay value for the further ranging signal on the basis of the measured ionospheric delay value for the multiple frequency ranging signal.

According to another aspect of the present invention, there is provided a satellite payload which is operable in either one of two modes. In the first mode, the satellite payload generates autonomous ranging signals which do not include augmentation data received from a ground station. In the second mode, the satellite additionally relays augmentation data received from the ground station.

In another aspect of the present invention, there is provided a satellite payload which is able to generate an autonomous ranging signal and to broadcast data received from a ground station. If no data is received from the ground station, the satellite payload generates dummy data for broadcast, so as to keep the broadcast channel open.

According to another aspect of the present invention, there is provided apparatus for connection to a satellite access node, which is arranged to receive augmentation data, to determine the position of a satellite accessible by the satellite access node, to determine whether the position of the satellite falls within a predetermined range dependent on the source of the augmentation data and to output augmentation data to the satellite access node if the position of the satellite falls within the predetermined range.

According to another aspect of the present invention, there is provided a satellite navigation receiver which is able to receive ionospheric delay data but is only able to use the ionospheric delay data when performing radiodetermination if access to the ionospheric delay data is enabled, for example by means of a code for decrypting the ionospheric delay data.

According to a further aspect of the present invention, there is provided an apparatus for providing augmentation data to a satellite access node which is arranged to encrypt ionospheric delay data without encrypting differential correction data which does not relate to ionospheric delay and to output the encrypted ionospheric delay data and the unencrypted differential correction data to the satellite access node.

According to another aspect of the present invention, there is provided a satellite navigation receiver which is arranged to receive ionospheric delay data and residual error data and to correct the ionospheric delay data using the residual error data.

According to another aspect of the present invention, there is provided a differential correction network which receives ionospheric delay data from another differential correction network, receives ranging signals from navigation satellites and thereby calculates errors in the ionospheric delay data.

Embodiments of the invention will now be illustrated, by way of example only, with reference to the accompanying drawings in which.

NAVIGATION SYSTEM

Figure 1:
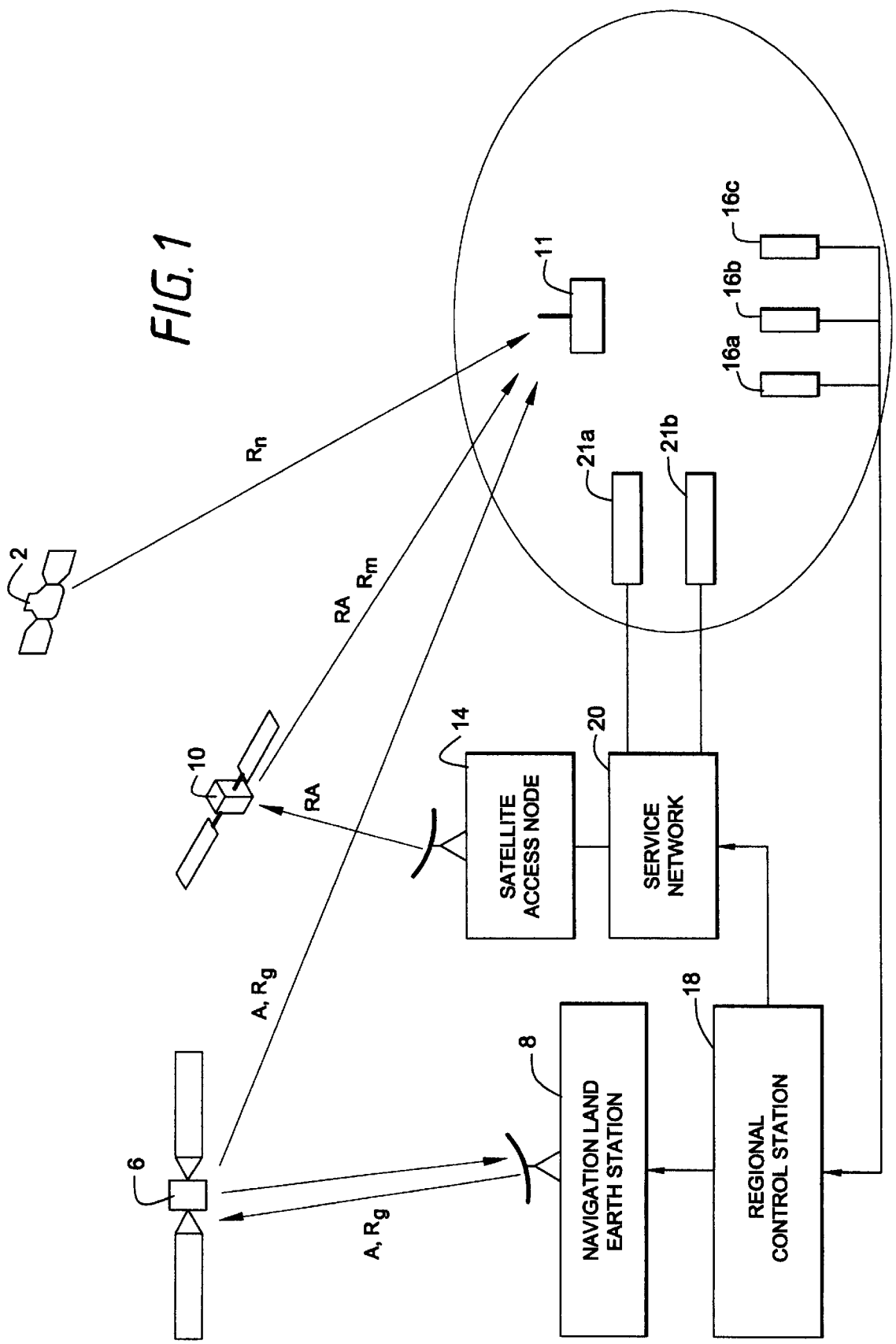
FIG. 1 is a schematic diagram of a satellite radiodetermination system.

FIG. 1 shows schematically the elements of a satellite radiodetermination system and the relationship between them. Autonomous ranging signals $R_n$ are provided by one or more GNSS (Global Navigation Satellite Service) satellites 2, such as GPS Navstar satellites and/or GLONASS satellites. A plurality of geostationary satellites 6, such as the proposed Inmarsat-3 communications satellites or dedicated geostationary navigation satellites, each carry a navigation transponder for relaying differential correction and other augmentation data A from a navigation land earth station (NLES) 8 to navigation receivers 11, the augmentation data A providing integrity, error and ionosphere information relating to the GNSS satellites 2 and their ranging signals $R_n$.

One or more medium earth orbit (MEO) satellites 10, such as the proposed satellites for the ICO (TM) global satellite communications system, relay regional augmentation data RA transmitted by a terrestrial satellite access node (SAN) 14 to the navigation receivers 11 incorporated in autonomous ranging signals $R_m$ synchronised with the ranging signals $R_n$ from the GNSS satellites 2. The proposed satellites for the ICO (TM) system are a constellation of ten satellites in 6 hour orbits in two orbital planes, each carrying a communications and navigation payload.

A network of monitoring stations 16a, 16b and 16c, of accurately known location, receive the ranging signals $R_n$ from the GNSS satellites 2, and the ranging signals $R_m$ from the MEO satellites 10 and calculate errors in the position and time information contained in these ranging signals from the difference between the positions calculated from the ranging signals R and the actual positions of the monitoring stations 16. Differential correction data is transmitted from the monitoring stations 16a, 16b and 16c to a regional control station 18 which derives the augmentation data A, including errors in the reported positions and time signals of the MEO satellites 10, and of the GNSS satellites 2. The monitoring stations 16 may alternatively be simple receivers with the calculation of differential correction being performed at the regional control station 18.

The position and timing errors in the ranging signals R do not vary between the monitoring stations 16a, 16b and 16c. However, the differential correction data received from the monitoring stations 16a, 16b and 16c will differ because of the difference in ionospheric delay in the signals received by each of the monitoring stations 16, dependent on the quantity of free electrons in the parts of the ionosphere through which the signals travel, together with other delays such as tropospheric delays caused by tropospheric refraction.

Therefore, the regional control station 18 is able to derive separately data for errors in the ranging signals $R_m$, $R_n$ and for values of ionospheric delay in the region of the ionosphere through which the ranging signals travel to reach each of the monitoring stations 16a, 16b and 16c. This data is transmitted to the NLES 8 for transmission as the augmentation data A via the geostationary satellites 6 to the navigation receivers 11.

Additionally, the augmentation data is transmitted to a service network 20 accessible by providers of regional augmentation systems 21a, 21b. Such regional augmentation systems 21a, 21b may include local monitoring stations for calculating differential correction data for specific regions. Regional augmentation data RA, which may for example include more accurate ionospheric data and corrections to the augmentation data A relevant to the specific regions, is input by the service providers at the service network 20. The regional augmentation data RA may include some or all of the augmentation data A. The regional augmentation data RA is transmitted to the SAN 14 for transmission via the MEO satellites 10 and selective reception by the navigation receivers The satellite radiodetermination system described above provides, in addition to existing satellite radiodetermination services such as GPS and GLONASS, the additional ranging signals $R_m$ from the MEO satellites 10. In this embodiment, the ranging signals $R_m$ are dual-frequency ranging signals similar to the signals available to military users in the GPS system, but are unencrypted and therefore available to any user. The above radiodetermination system also broadcasts augmentation data A over a wide area via the geostationary satellites 6, which is supplemented by additional regional augmentation data RA broadcast by the MEO satellites 10.

The augmentation data A is encoded in ranging signals $R_g$ generated by the NLES 8 and broadcast via the geostationary satellite 6 to the navigation receivers 11. The location of the geostationary satellite 6 is determined at the NLES 8, which also includes an accurate time reference, such as an atomic clock or a dual frequency satellite radiodetermination apparatus, synchronised to those on board the MEO satellites 10 and the GNSS satellites 2. The delay involved in transmitting the ranging signal $R_g$ from the NLES 8 to the geostationary satellite 6 is determined and the ranging signal $R_g$ includes position and time data calculated so as, when retransmitted by the geostationary satellite 6, accurately to represent the time of retransmission and the position of the geostationary satellite 6.

The signal retransmitted to the NLES 8 by the geostationary satellite 6 provides a timing loop which allows the delay from the NLES 8 to the geostationary satellite 6 to be determined and also allows ionospheric effects to be measured. In this way, the ranging signal $R_g$ is sufficiently precise to be processed as if it were autonomously generated by the geostationary satellite 6.

The satellite radiodetermination system described above may be implemented in stages to provide a progressively enhanced service relative to that provided by the GNSS satellites 2 above, as follows.

Stage 1 —Existing or previously planned geostationary communication satellites such as the Inmarsat-3 satellites are used as the geostationary satellites 6 to relay ranging signals and augmentation data $R_g$, A.

Stage 2—Additional dedicated navigation satellites are put into geostationary orbit as additional geostationary satellites 6. These dedicated navigation satellites are able to generate autonomous ranging signals $R_g$.

Stage 3—The MEO satellites 10 are launched, providing additional ranging signals $R_m$ and relaying regional augmentation data RA.

Stage 1 provides wide area augmentation, for example in accordance with the WAAS specification. States 1 to 3 provide more ranging signals, to reduce the reliance on the GNSS satellites 2, which have selective availability.

System Operation Example

Figure 2:
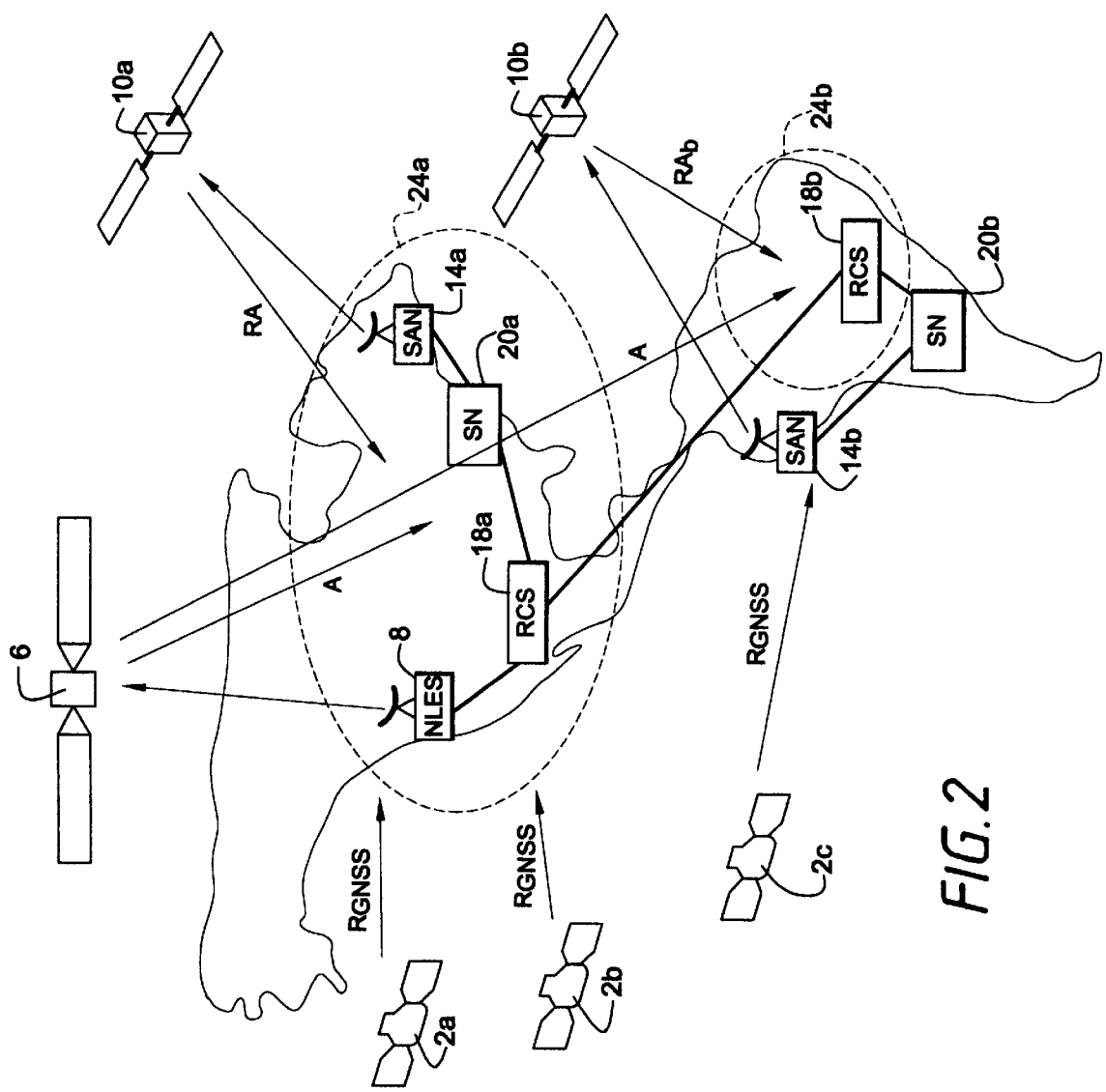
FIG. 2 is a schematic diagram of a portion of the satellite radiodetermination system serving North and South America.

FIG. 2 shows an example of the satellite radiodetermination system of FIG. 1 providing a navigation service over North and South America. One of the geostationary satellites 6 broadcasts augmentation data A derived by a first regional control station 18a over both North and South America. In a first service area 24a which covers the US, a first service network 20a provides regional augmentation data RAa which is valid only over the first service area 24a, such as more accurate ionospheric data concerning the ionosphere above the US. The regional augmentation data RAa is transmitted to a first satellite access node 14a and broadcast via a first MEO satellite 10a over the first service area 24a. Ranging signals $R_g$ are available in the first service area 24a from GNSS satellites 2a and 2b. The number and identity of the GNSS satellites 2 which are visible above a predetermined minimum elevation angle in the first service area 24a will change with time as these satellites 2 progress in their orbits.

A first MEO satellite 10a will also move relative to the first service area 24a until its elevation angle falls below a threshold which is suitable for broadcast reception. The first SAN 14a then selects another MEO satellite 10 having an elevation angle above the threshold for broadcast reception, preferably one that is approaching the first service area 24a. The SAN 14a ceases transmission to the first MEO satellite 10a and begins transmission to the selected MEO satellite 10 instead. To avoid interruption in broadcast of the regional augmentation data RA, the SAN 14a may transmit to both the first MEO satellite 10a and the selected MEO satellite 10 during handover.

A second service area 24b in South America contains a second regional control station 18b which receives information from a monitoring network which monitors ranging signals received in the second service area 24b. Information from the second regional control station 18b is sent to the first regional control station 18a so that wide area differential correction information is gathered from a monitoring network extending through both North and South America. In this way, the timing and position errors of ranging signals may be determined more accurately. A second service network 20b receives information from the second regional control station 18b and additionally derives more accurate ionospheric information within the area 24b. This information is relayed to a second SAN 14b which transmits the information via a second MEO satellite lob for broadcast over the second service area 24b.

Hence, augmentation information which is valid over a wide area is broadcast by the geostationary satellite 6, which has a direct line of sight to a wide area. More detailed information of narrower geographic validity is broadcast by the MEO satellites 10 which are able to cover a smaller area of the earth's surface. In this way, the information broadcast by geostationary and MEO satellites is matched with the coverage areas of these satellites.

Navigation Satellite

Figure 3:
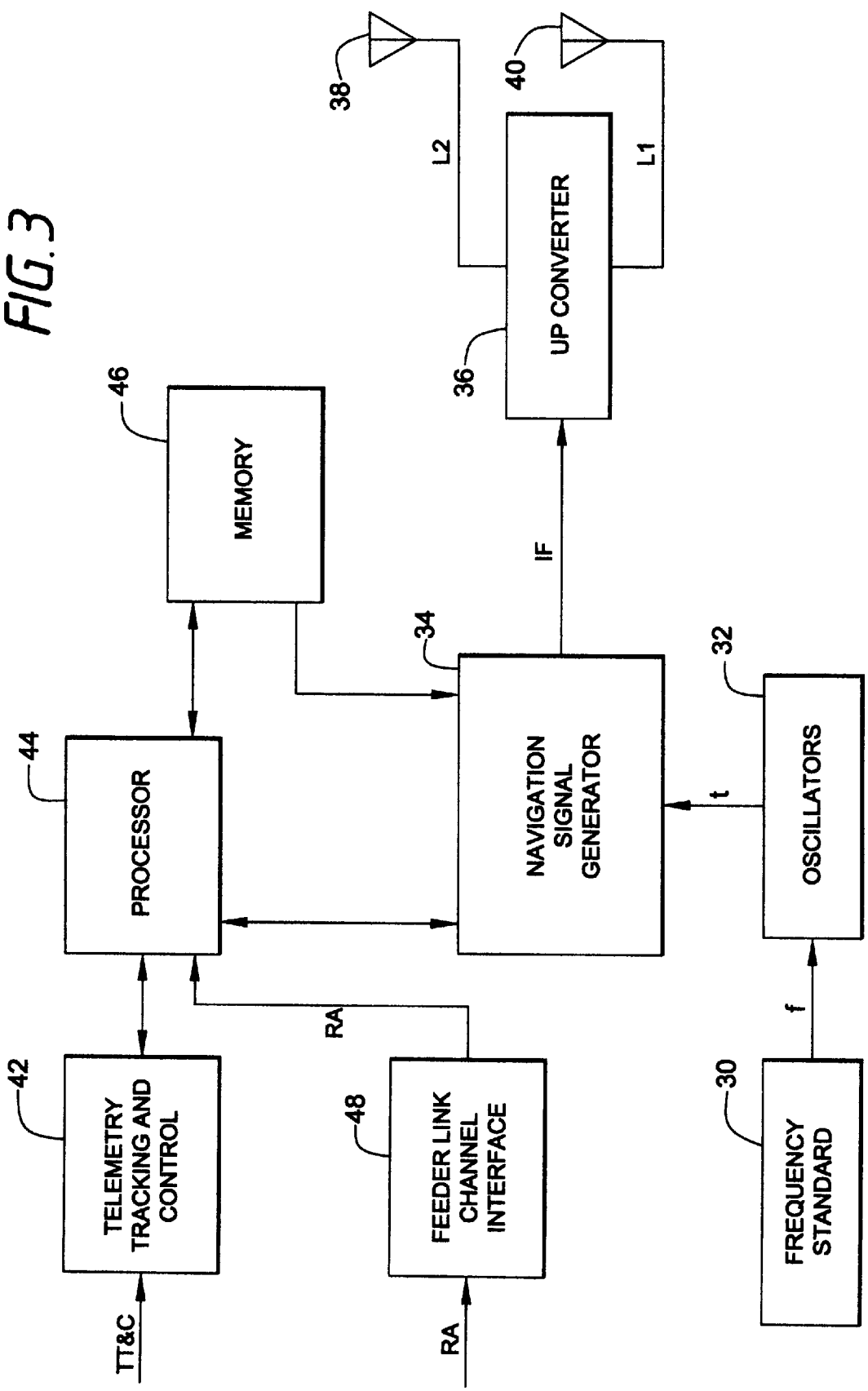
FIG. 3 is a block diagram of the navigation payload of a MEO satellite.

FIG. 3 shows the navigation payload of one of the MEO satellites 10.

The payload includes a frequency standard 30, such as an atomic clock. A highly precise frequency signal f is supplied from the frequency standard 30 to oscillators 32, which provide a time signal t which is referenced to a standard time such as UTC.

The time signal t is supplied to a navigation signal generator 34. The payload also includes a telemetry tracking and control (TT&C) interface 42 which receives encrypted TT&C data from a TT&C ground station (not shown). The TT&C interface 42 supplies tracking information to a processor 44 which generates data containing information on the ephemerides of the MEO satellite 10. The ephemerides are written into a memory 46, which applies error correction to avoid data corruption from external radiation and has a double buffer so that previous ephemerides are not immediately overwritten by new ephemerides until the new ephemerides are verified. The ephemerides are read from the memory 46 by the navigation signal generator 34, which encodes the time signal t and ephemerides using a Gold code of the same family as is used by GPS/Navstar satellites as described in the GPS specification. The Gold code is a pseudo-random noise (PRN) code having low auto-correlation and low cross-correlation with other Gold codes.

Intermediate frequency signals IF containing the encoded ephemerides and time data are supplied to an up-converter 36 which converts the intermediate frequency signal IF to different frequencies F1 and F2 which are respectively transmitted through broadcast antennas 40 and 38.

The frequencies F1 and F2 may be substantially the same as the GPS L1 and L2 frequencies, to maintain compatibility with existing GPS receivers, or they may be offset from the L1 and L2 frequencies so that signals from the MEO satellites 10 may only be received by modified navigation receivers 11. In one embodiment, F1 is 1576 MHz and F2 is 1228 MHz.

The operation of the navigation signal generator 34 is controlled by the processor 44, and status information is supplied by the navigation signal generator 34 to the processor 44.

The payload also includes a feeder link channel interface 48 which receives regional augmentation information RA from the SAN 14. The processor 44 selectively supplies the regional augmentation information RA to the memory 46 for inclusion in the signal output by the navigation signal generator 34.

The processor 44 is operable in both an autonomous navigation mode and a regional augmentation mode. In the autonomous navigation mode, data supplied by the feeder link channel interface 48 is not sent to the memory 46 and therefore the MEO satellite 10 broadcasts only ranging and status information, at a data rate of 50 bits per second. In the regional augmentation mode, the regional augmentation data RA received from the feeder link channel interface 48 is supplied to the memory 46 for inclusion in the navigation signal. In this mode, the MEO satellite 10 additionally broadcasts information on the integrity and status of the GNSS satellites 2, differential correction information supplied by the service network 20 and alert messages to indicate when satellite radiodetermination may not be possible to a predetermined level of accuracy, at a data rate of 250 bits per second. The processor 44 is switched between these two modes by a command received by the TT&C interface 42. The processor 44 may be switched into autonomous navigation mode when no regional augmentation data is available, for example because no SAN 14 is in view or the SAN 14 is faulty.

Alternatively, the processor 44 may generate dummy data for transmission in the ranging signal $R_m$, the dummy data indicating to the navigation receivers 11 that no regional augmentation data is available.

Satellite Radiodetermination Terminal

Figure 4:
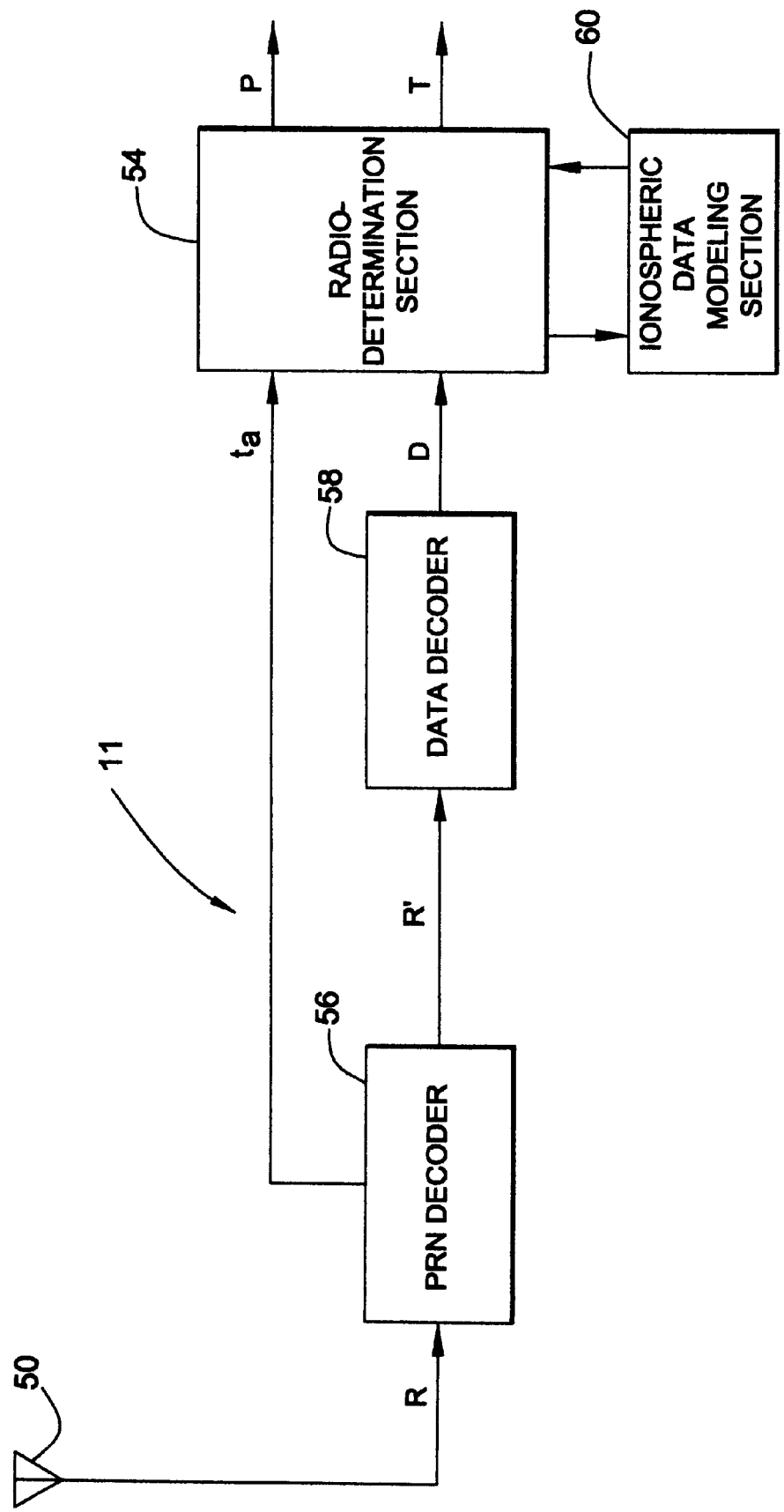
FIG. 4 is a block diagram of a navigation receiver.

FIG. 4 shows a simplified block diagram of a navigation receiver 11 for receiving ranging and augmentation signals in the satellite radio-determination system described above. The user terminal 11 includes an antenna 50 for receiving the ranging signals $R_g$, $R_m$ and $R_n$, containing the augmentation information A and the regional augmentation information RA. A PRN decoder 56 decodes each ranging signal R and outputs decoded ranging signals R' and timing data $t_a$ relating to the time of arrival of each ranging signal. A data decoder 58 extracts from the decoded ranging signals data D, including the augmentation data A, regional augmentation data RA, the transmission time t of each ranging signal and the ephemerides of the satellites. A radiodetermination section 54 receives the data D and timing data $t_a$, calculates therefrom the values of ionospheric delays incurred by the dual frequency ranging signals $R_n$, and the approximate position of the navigation receiver 11 and outputs this data to an ionospheric modelling section 60, together with ionospheric data included in the regional augmentation data RA and the augmentation data A.

From this data, the ionospheric modelling section 60 calculates ionospheric pierce points at which each of the ranging signals R passed through the ionosphere and estimates the ionospheric delay thereby incurred by single-frequency ranging signals R, such as the L1 GPS signals, for which the ionospheric delay cannot be measured directly. The ionospheric modelling section 60 outputs an estimated ionospheric delay for each of the single frequency ranging signals R together with error bounds for the estimated delay.

The radiodetermination section 54 receives the estimated ionospheric delays and subtracts them from the time of arrival $t_a$ of the single-frequency signals. The directly measured delays incurred by the dual frequency ranging signals are subtracted from the times of arrival $t_a$ of these signals. The augmentation data A and regional augmentation data RA include information on errors in the ranging signals, which is used to correct the position and time information in each of the ranging signals. The augmentation data A and regional augmentation data RA also include integrity information which indicates whether any of the satellites has failed or is operating incorrectly; the ranging signals R from such satellites are not used for radiodetermination.

The radiodetermination section 54 then calculates an accurate position P and time T from the corrected ranging signals R and an estimate of the error in the position P and time T from the error bounds in ionospheric delay indicated by the ionospheric modelling section 60 and from error bounds for the ranging signals indicated by the augmentation data RA,A. If the likely error in the position P and time T exceeds a predetermined value, the radiodetermination section 54 may indicate a visual or audible warning, so that users know that the output should not be relied upon for certain applications.

Figure 5:
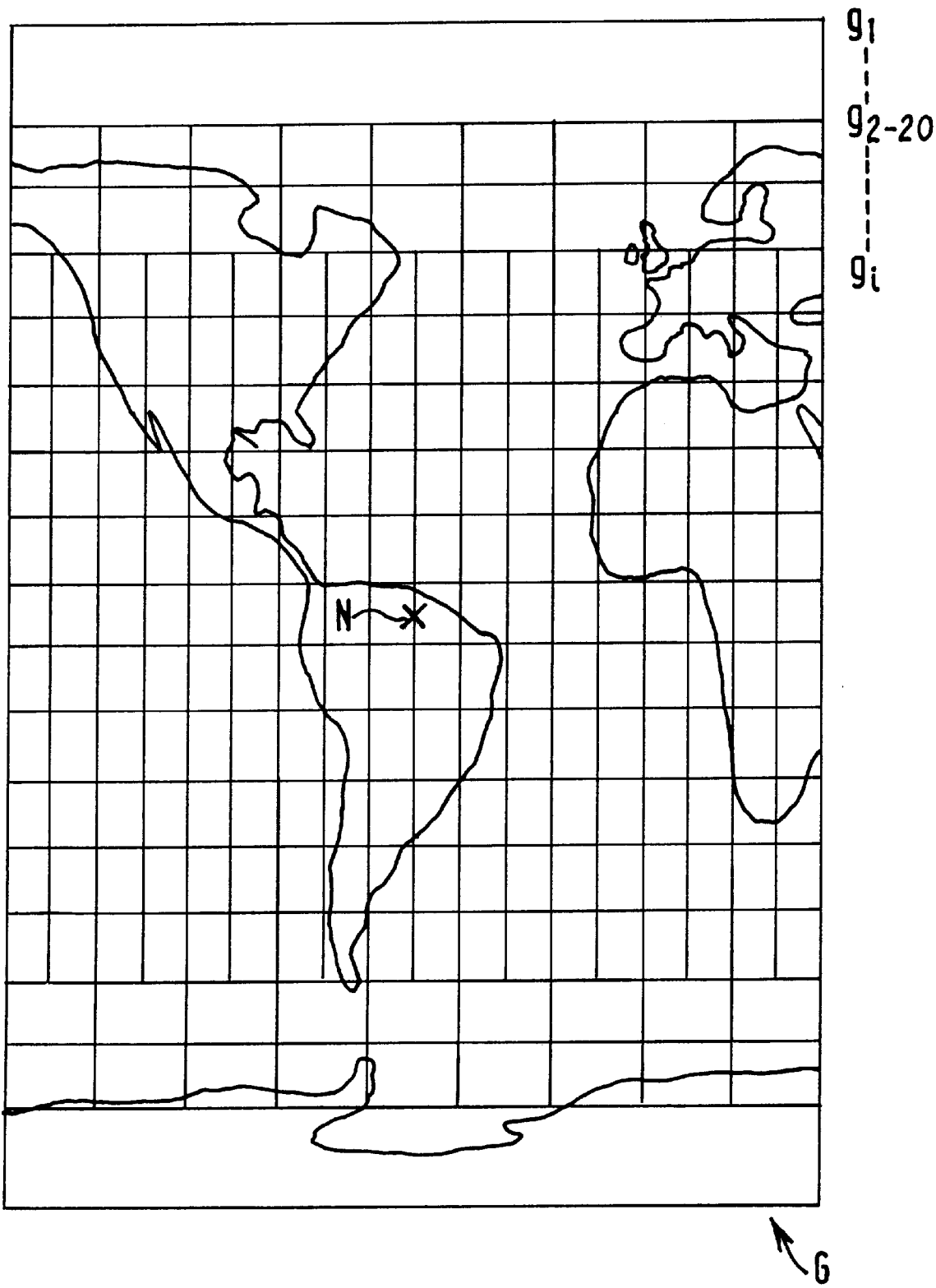
FIG. 5 is a diagram of a grid used to represent ionospheric information.

An explanation of the operation of the ionospheric modelling section 60 will now be given with reference to FIGS. 5 and 6.

The augmentation data A broadcast by the geostationary satellites 6 and the regional augmentation data RA broadcast by MEO satellites 10 includes ionospheric data comprising a set of values for calculating ionospheric delay for points on a grid G mapped onto the earth's surface. The grid is centered on the nadir N of a geostationary satellite position and the ionospheric delay value at each grid point $g_i$ represents the vertical ionospheric delay at that grid point.

Information is seldom available for all the grid points $g_i$ and the ionospheric data therefore comprises a list of addresses i of grid points $g_i$ for which ionospheric data is available, together with the associated vertical ionospheric delay and delay error for each of these points. The ionospheric data also includes the position of the nadir N on which the grid of points is centered.

The format for ionospheric data described above is designed for broadcast from a geostationary satellite, but is also used for ionospheric information broadcast by the MEO satellites 10. The SAN 14 calculates a hypothetical geostationary position so that the coverage area of the MEO satellite 10, within which the satellite is visible above 5° elevation, falls within the grid of points $g_i$ based on that position. Ionospheric data is broadcast for some or all of the grid points which fall within the coverage area of the MEO satellite 10. Thus, the ionospheric data broadcast by the geostationary satellite 6 and the MEO satellites 10 have compatible formats.

In order to estimate accurately the ionospheric delay for each ranging signal R, the ionospheric modelling section 60 of the navigation receiver 11 must calculate a pierce point PP at which the ranging signal R passes through the ionosphere on its way to the user and apply the appropriate ionospheric delay value for that pierce point.

Figure 6:
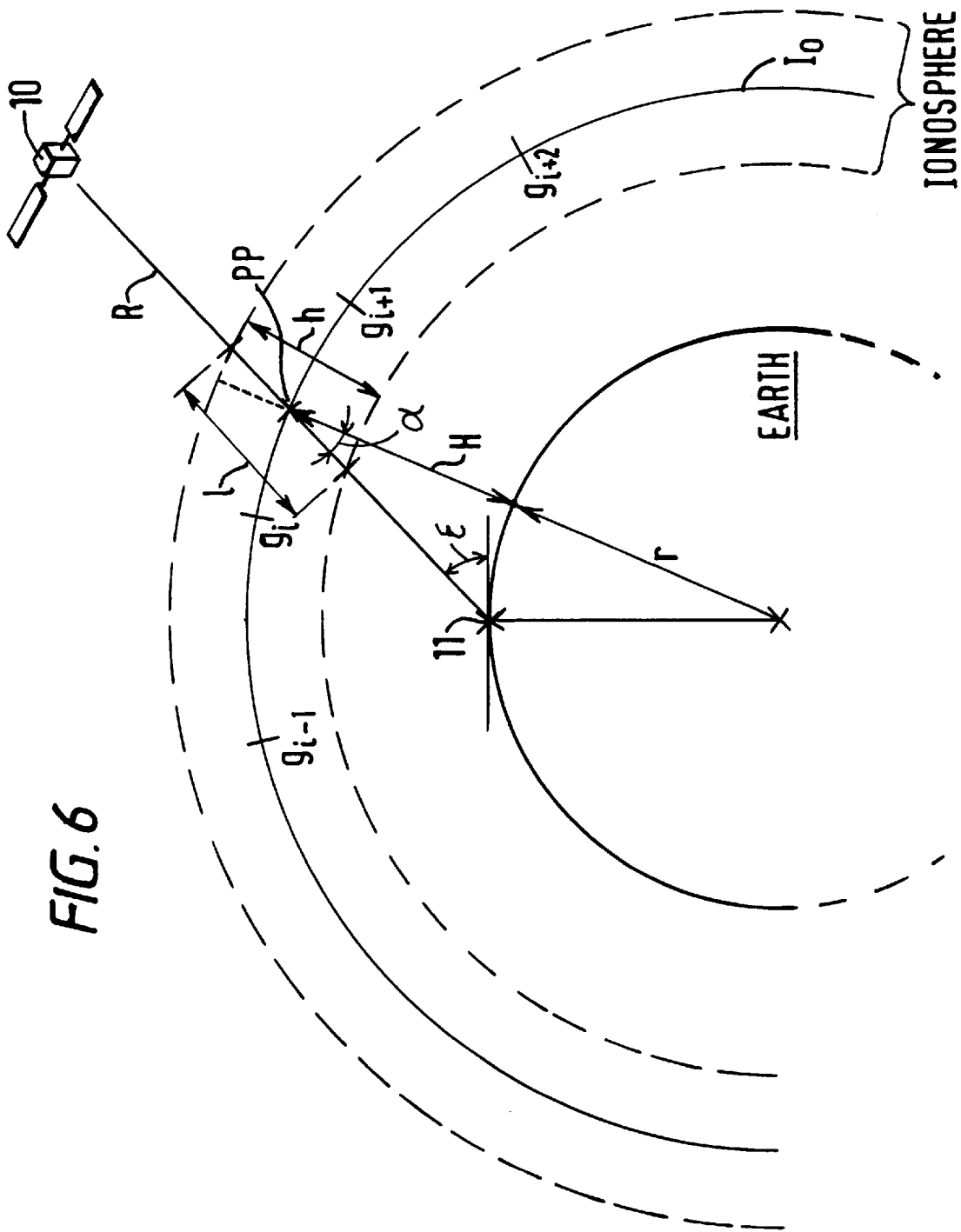
FIG. 6 is a diagram to illustrate calculation of ionospheric pierce points.

As shown in FIG. 6, a ranging signal R is transmitted by a satellite, such as one of the MEO satellites 10, at an elevation angle E with respect to the navigation receiver 11. The ranging signal R passes the level of maximum electron density $I_0$ of the ionosphere at the pierce point PP. The height H of the level $I_0$ is assumed to be 400 km above the earth's surface. The navigation receiver 11 is able to derive its approximate position from the uncorrected ranging signal R, which also contains information on the position of the satellite 10. From this information, and from the radius r of the earth, the latitude and longitude of the pierce point PP is calculated in a known manner.

The calculated pierce point PP does not usually coincide with one of the grid points $g_i$ for which ionospheric information is available. The value for ionospheric delay must therefore be interpolated between grid points $g_i$, $g_{i+1}$ for which ionospheric information is available. The ionospheric modelling section 60 generates a modelling function which may be varied by one or more parameters so as to fit the ionospheric information at the surrounding grid points $g_i$ and which is used to interpolate the ionospheric delay value at the pierce point PP.

A suitable model for interpolating ionospheric delay values has been specified for the WAAS. In this model, the ionospheric delay values for the four grid points at the corners of a cell containing the pierce point PP are used to interpolate an ionospheric delay value at the pierce point by means of a weighting function which provides a continuous surface as a function of longitude and latitude. Alternatively, a linear interpolation may be taken between pairs of grid points in both the longitudinal and latitudinal directions.

In addition, the ionospheric delay modelling section 60 may fit the modelling function to the directly measured ionospheric delay values obtained from the dual frequency ranging signals $R_m$, by calculating the pierce points PP for these signals and adjusting the parameters of the modelling function to fit the measured ionospheric delay values for these pierce points PP.

The modelling function need not fit the ionospheric information and measured delay values exactly; instead, an approximate fit such as a least squares fit may be calculated.

The vertical ionospheric delay value at the pierce point is thereby calculated. However, the ranging signal R travels a distance l through the ionosphere which is greater than the vertical height h of the ionosphere, as a result of the slant angle $\alpha$ which the path of the ranging signal R makes with the vertical. The vertical ionospheric delay value is therefore multiplied by an obliquity factor, to take into account the greater length of ionosphere traversed.

User Operation Example

A specific example will now be described of the operation of an alternative embodiment of a satellite radiodetermination system which provides a navigation service for Africa in which a geostationary satellite 6 provides a ranging signal $R_g$ and augmentation information A comprising correction messages for the GNSS satellite ranging signals $R_n$, but ionospheric correction information is not provided through the geostationary satellites 6 in this embodiment, since insufficient information is available for Africa as a whole.

However, regional monitoring stations are provided by local service providers in Kenya. The monitoring stations monitor the ranging signals from the MEO satellites 10 and the GNSS satellites 2 and additionally receive the augmentation information A broadcast by the geostationary satellites 6. From this information a vertical ionospheric delay value and ionospheric delay error bounds are estimated which are applicable for all users in Kenyan territory and airspace. This information is relayed to a SAN 14 for broadcast through an MEO satellite 10 which covers Kenya at that time.

The navigation satellites visible by a navigation receiver 11 approaching Nairobi are, for example, those shown in Table 1 below.

TABLE 1

| Satellite | Azimuth | Elevation |
| --- | --- | --- |
| MEO 2 | 184 | 27 |
| MEO 9 | 310 | 12 |
| MEO 10 | 40 | 11.5 |
| AOR-E GEO | 269 | 30 |

TABLE 1-continued

| Satellite | Azimuth | Elevation |
| --- | --- | --- |
| IOR GEO | 91 | 58 |
| GFS 2 | 250 | 73 |
| GPS 4 | 355 | 24 |
| GPS 13 | 150 | 27 |

The satellite AOR-E is an Inmarsat (TM) satellite serving the eastern Atlantic Ocean region, while the satellite IOR serves the Indian Ocean region.

The navigation receiver is able to determine the approximate positions of all the above satellites from ranging signals generated or relayed by the satellites, without ionospheric correction. Estimates of the ionospheric delay in the ranging signals from each of the satellites are then obtained as follows.

The ionospheric delay is calculated directly for the dual frequency ranging signals transmitted by the satellites $MEO_2$, $MEO_9$ and $MEO_{10}$. The AOR-E geostationary satellite is identified as being in the same quadrant as the $MEO_9$ satellite. The ionospheric delay value in the $MEO_9$ ranging signal is used to estimate the ionospheric delay in the AOR-E GEO ranging signal, by compensating for the difference in elevation angles between the $MEO_9$ satellite and the AOR-E geostationary satellite. The ionospheric delays for the $GPS_4$ and $GPS_{13}$ satellites are estimated in the same way, using the ionospheric delay value measured for the $MEO_9$.

The $GPS_2$ satellite is approximately overhead and therefore the ionospheric delay information provided by the Kenyan monitoring stations is used, with a small obliquity factor correction for the difference between the actual elevation angle of 72° and 90°. The ionospheric delay error bound data are applied to each of the estimated ionospheric delays which are not measured directly from a dual frequency ranging signal.

In this example, the navigation terminal 11 receives ranging signals from eight different satellites and is able to calculate or estimate the ionospheric delay for each ranging signal without ionospheric data being provided in the augmentation data A. In addition, integrity information received from the geostationary satellites is used to determine whether any of the ranging signals should not be used for satellite radiodetermination. Thus, the result of the radiodetermination is accurate and reliable.

Regional Augmentation Information

In the above example, ionospheric delay information relevant to Kenya is relayed through one or more of the MEO satellites 10. Each MEO satellite is able to broadcast over an area much wider than Kenya, for example, and the SAN 14 receives both the data provided by the Kenyan service provider and data provided by other networks. In the transmission from the SAN 14, the data from each network is assigned a different time slot in a repeating time frame, so that the information from the different monitoring networks is time division multiplexed. Table 2 below shows an example of the allocation of time slots to each of the satellites $MEO_2$, $MEO_9$ and $MEO_{10}$ in the above example.

TABLE 2

| Satellite | Slot 1 | Slot 2 | Slot 3 | Slot 4 | Slot 5 | Slot 6 |
| --- | --- | --- | --- | --- | --- | --- |
| MEO 2 | Kenya | Africa | Other | Other | Africa | Other |
| MEO 9 | Kenya | Other | Europe | Other | Other | Europe |
| MEO 10 | Kenya | Other | Other | Other | Other | Other |

The satellite $MEO_2$ transmits, in slots 2 and 5, regional augmentation data which is valid over the whole of Africa and this information may additionally be used by the navigation receiver 11 in Kenya.

Each slot may for example be a 1 second slot in a 6 second time frame and carry 250 data bits.

Slots may be allocated by the SAN 14 to service providers during a period in which the nadir of the MEO satellite 10 carrying the regional augmentation information passes over a predetermined region, allocated to the service provider, defined for example by longitude and latitude boundaries. For example, each region may comprise a 5° longitudinal strip of the Northern or Southern Hemisphere.

Each slot may be shared by several service providers, which individually do not supply enough data to occupy a whole slot, so that the full capacity of each slot is used. The data from each service provider within the slot is identified by a code allocated to that service provider. More than one slot may be allocated to service providers which require more capacity than can be provided by one slot. Charging data for calculating a charge to the service provider is generated according to the duration for which capacity on the MEO satellite 10 is allocated to the service provider and according to the proportion of the capacity used during that time.

Alternatively, slots may be allocated to service providers during a period in which the MEO satellite 10 is visible above a minimum elevation angle, such as 5°, from the service area for which the service provider provides regional augmentation data RA.

The regional augmentation data in each time slot is preferably encrypted to ensure that it can only be decoded by licensed navigation receivers 11. All licensed receivers may use the same algorithms for performing radiodetermination using the ionospheric delay data, so that radiodetermination is performed to a common standard.

Additionally, users may be required to purchase a smart card for insertion in the navigation receiver 11 to allow access to some or all of the regional augmentation information RA broadcast by the MEO satellites. In this way, revenue may be collected by the service providers. Alternatively, the user terminals may have a keyboard for entering a code which enables access to one or more of the regional augmentation information slots.

In this way, different types of information may be made available to different users, depending on the area for which they need ionospheric information or the level of accuracy which they require, and the users may only be charged for the information which they need.

In the above example, the different types of augmentation information are time division multiplexed. However, the different information channels may be multiplexed together in other ways well known in the art, such as by code division multiplexing or frequency division multiplexing.

The information in each regional augmentation information channel may include data, such as country codes, for identifying the area for which the ionospheric data is valid, data indicating the reliability of ionospheric data and data indicating for what period the ionospheric data is valid.

Since the ionospheric delay modelling section 60 of the navigation receiver 11 is able to combine ionospheric delay information with direct ionospheric delay measurements, a more accurate model of the ionosphere is used to compensate for ionospheric delay. Furthermore, regional augmentation data RA is received which is relevant to the local area in which the navigation terminal 11 is located. Integrity data and error bound data is received both in the regional augmentation data RA and the augmentation data A. In this way, highly accurate position readings P and time readings T may be calculated, together with estimates of the level of accuracy of these readings and warnings if the level of accuracy falls below a predetermined threshold.

Such accurate and reliable radiodetermination greatly extends the potential applications of satellite radiodetermination.

For example, the above described satellite radiodetermination system may be used where safety is critical, such as landing aircraft in low visibility conditions. The system also has maritime applications in that it provides sufficient accuracy for harbour approaches in restricted visibility, and may also find applications in train control where sufficient accuracy is needed to determine on which track a train is running. The system may provide accurate time readings for use by laboratories or communication systems which require precise synchronisation.

Since all of the ranging and augmentation information is provided by satellite, the need to install terrestrial differential correction systems may be overcome.

Although the above embodiments use MEO satellites such as ICO (TM) satellites, other satellite constellations could be used such as those proposed for the ODYSSEY (TM), IRIDIUM (TM;), GLOBALSTAR (TM) and TELEDESIC (TM) satellite communications systems. Satellites in low earth orbits (LEO) produce greater Doppler shift in their signals, but this may be overcome by appropriate compensation in the receivers. The satellite configurations described in the embodiments are particularly advantageous, but alternative configurations may be used. For example, autonomous navigation signal generation equipment may be replaced by transponders for retransmitting navigation signals in the non-geostationary satellites. Regional augmentation data may be broadcast by geostationary or non-geostationary satellites having multiple spot beams, with the regional validity of the data broadcast in each spot beam being matched to the coverage area of each that spot beam.

Navigation receivers may determine their altitude from map data giving altitude as a function of longitude and latitude, or from barometric pressure, so that only three ranging signals are required to determine longitude, latitude and time.

We claim:

1. Satellite radiodetermination apparatus, comprising:
   a radio receiver for receiving a multiple frequency ranging signal from a first satellite and a further ranging signal from a second satellite, the radio receiver including;
   deriving means for deriving first ionospheric delay data from said multiple frequency ranging signal; and
   estimating means for estimating second ionospheric delay data for the further ranging signal on the basis of said first ionospheric delay data.

2. Apparatus as claimed in claim 1, further comprising data receiving means for receiving ionospheric data, said estimating means being operable to estimate the second ionospheric delay data additionally on the basis of said ionospheric data.

3. Apparatus as claimed in claim 2, wherein said data receiving means is arranged to receive said ionospheric data from a satellite.

4. Apparatus as claimed in claim 2 or 3, wherein said ionospheric data represents a plurality of ionospheric delay values corresponding to a plurality of spatially separated points.

5. Apparatus as claimed in claim 1, wherein said estimating means includes modelling means for generating a model of spatial variation of ionospheric delay on the basis of said first ionospheric delay data, said estimating means being operable to estimate said second ionospheric delay data on the basis of said model.

6. Apparatus as claimed in claim 5, wherein said modelling means is operable to generate said model on the basis of said ionospheric data.

7. Apparatus as claimed in claim 5, wherein said model comprises a function which is variable in accordance with one or more parameters, said modelling means being arranged to calculate said one or more parameters such that said function is fitted to said first ionospheric delay data.

8. Apparatus as claimed in claim 7, wherein said modelling means is arranged to calculate said one or more parameters such that said function is additionally fitted to said ionospheric data.

9. A method of satellite radiodetermination, comprising receiving at a receiver a multiple frequency ranging signal from a first satellite;

receiving at the receiver a further ranging signal from a second satellite, deriving at the receive first ionospheric delay data from said multiple frequency ranging signal; and estimating at the receiver second ionospheric delay data for the further ranging signal on the basis of said first ionospheric delay data.

* * * * *

UNITED STATES PATENT AND TRADEMARK OFFICE
CERTIFICATE OF CORRECTION

PATENT NO.: 6,040,798
DATED: March 21, 2000
INVENTORS: George Vladimir KINAL, *et al.*

It is certified that an error appears in the above-identified patent and that said Letters Patent is hereby corrected as shown below:

In Column 6, line 15, "1ob" has been deleted and --10*b*-- has been inserted.

Signed and Sealed this

Fifteenth Day of May, 2001

*Attest:*

NICHOLAS P. GODICI

*Attesting Officer*     *Acting Director of the United States Patent and Trademark Office*